United States Patent
Meisner et al.

(10) Patent No.: US 9,637,047 B2
(45) Date of Patent: May 2, 2017

(54) METHOD AND CONTROL UNIT FOR ADAPTING AN UPPER HEADLIGHT BEAM BOUNDARY OF A LIGHT CONE

(71) Applicant: Robert Bosch GmbH, Stuttgart (DE)

(72) Inventors: Robert Meisner, Kornwestheim (DE); Johannes Foltin, Ditzingen (DE); Tobias Ehlgen, Ravensburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/370,366

(22) PCT Filed: Dec. 3, 2012

(86) PCT No.: PCT/EP2012/074270
§ 371 (c)(1),
(2) Date: Jul. 2, 2014

(87) PCT Pub. No.: WO2013/102525
PCT Pub. Date: Jul. 11, 2013

(65) Prior Publication Data
US 2015/0151669 A1 Jun. 4, 2015

(30) Foreign Application Priority Data
Jan. 3, 2012 (DE) .......... 10 2012 200 048

(51) Int. Cl.
*B60Q 1/08* (2006.01)
*B60Q 1/14* (2006.01)
(Continued)

(52) U.S. Cl.
CPC .......... *B60Q 1/085* (2013.01); *B60Q 1/10* (2013.01); *B60Q 1/143* (2013.01);
(Continued)

(58) Field of Classification Search
CPC .................. B60C 1/085; B60C 1/143
See application file for complete search history.

(56) References Cited

U.S. PATENT DOCUMENTS

| 6,144,158 A | 11/2000 | Beam |
| 6,396,397 B1 * | 5/2002 | Bos .......... B60N 2/002 180/167 |

(Continued)

FOREIGN PATENT DOCUMENTS

| CN | 101242696 A | 8/2008 |
| CN | 201580308 U | 9/2010 |

(Continued)

*Primary Examiner* — Dale Moyer
(74) *Attorney, Agent, or Firm* — Gerard Messina

(57) ABSTRACT

A method for adapting an upper headlight beam boundary of a light cone of at least one headlight of a vehicle includes reading in at least one configuration position of an illumination unit on another vehicle and/or of a vehicle contour of the other vehicle to provide an identification signal of the other vehicle. In addition, the method includes ascertaining the type of the other vehicle, using the identification signal of the other vehicle, and outputting a control signal for adapting the upper headlight beam boundary, the control signal being output taking the ascertained type of vehicle into account.

12 Claims, 8 Drawing Sheets

(51) Int. Cl.
*G06K 9/00* (2006.01)
*B60Q 1/10* (2006.01)
*G08G 1/16* (2006.01)

(52) U.S. Cl.
CPC ......... *G06K 9/00825* (2013.01); *G08G 1/161* (2013.01); *B60Q 2300/056* (2013.01); *B60Q 2300/132* (2013.01); *B60Q 2300/136* (2013.01); *B60Q 2300/41* (2013.01); *B60Q 2300/42* (2013.01)

(56) References Cited

U.S. PATENT DOCUMENTS

| | | | |
|---|---|---|---|
| 2006/0018511 A1* | 1/2006 | Stam | B60Q 1/085 382/104 |
| 2007/0047244 A1* | 3/2007 | Eberhardt | B60Q 1/085 362/464 |
| 2007/0262882 A1 | 11/2007 | Yamamoto | |
| 2008/0130302 A1* | 6/2008 | Watanabe | B60Q 1/085 362/466 |
| 2009/0254247 A1* | 10/2009 | Osanai | B60Q 1/143 701/36 |
| 2010/0061594 A1* | 3/2010 | Heinrich | B60Q 1/143 382/103 |
| 2012/0226412 A1* | 9/2012 | Nakadate | B60Q 1/143 701/36 |
| 2013/0049587 A1* | 2/2013 | Nakadate | B60Q 1/08 315/82 |
| 2013/0218413 A1* | 8/2013 | Tanaka | B60Q 1/143 701/36 |

FOREIGN PATENT DOCUMENTS

| | | | | |
|---|---|---|---|---|
| DE | 10 2006 005 512 | | 8/2006 | |
| EP | 1 757 485 | | 2/2007 | |
| EP | 2 119 592 | | 11/2009 | |
| EP | 2 147 823 | | 1/2010 | |
| EP | 2 479 064 | | 7/2012 | |
| JP | 07 172232 | | 7/1995 | |
| JP | 2007112249 A | | 5/2007 | |
| JP | 2009040351 A | | 2/2009 | |
| JP | 2010116036 A | | 5/2010 | |
| JP | WO 2012063365 A1 * | 5/2012 | ............ B60Q 1/143 |
| WO | WO 2012/116931 | | 9/2012 | |

* cited by examiner

METHOD AND CONTROL UNIT FOR ADAPTING AN UPPER HEADLIGHT BEAM BOUNDARY OF A LIGHT CONE

FIELD OF THE INVENTION

The present invention relates to a method for adapting an upper headlight beam boundary of a light cone of at least one headlight of a vehicle, a control unit for adapting an upper headlight beam boundary of a light cone of at least one headlight of a vehicle, and a corresponding computer program product.

BACKGROUND INFORMATION

Conventional headlight leveling control (HLC) of a headlight of a vehicle allows vertical swiveling of at least one beam-forming portion of the headlight or of a light source of the headlight in order to adapt a light cone of the headlight to a load situation of the vehicle. Automatic headlight leveling control may recognize a suspension state and load state of the vehicle via at least one chassis sensor. For example, the automatic headlight leveling control may compensate for pitching motions of the vehicle caused by acceleration forces such as stopping or braking, so that the light cone maintains a preset illumination range despite the pitching motion.

Patent document EP 2 119 592 A1 discusses a control unit for controlling the light distribution and the horizontal light-dark cutoff of main headlights of a motor vehicle, which includes a signal processing arrangement for generating control signals for the main headlights.

SUMMARY OF THE INVENTION

Against this background, the present invention provides a method for adapting an upper headlight beam boundary of a light cone of at least one headlight of a vehicle, as well as a device for adapting an upper headlight beam boundary of a light cone of at least one headlight of a vehicle and lastly, a corresponding computer program product, according to the main claims.

Advantageous embodiments result from the respective subclaims and the following description.

The present invention provides a method for adapting an upper headlight beam boundary of a light cone of at least one headlight of a vehicle, the method including the following steps:

reading in at least one configuration position of an illumination unit on another vehicle and/or of a vehicle contour of the other vehicle in order to provide an identification signal of the other vehicle;

ascertaining the type of the other vehicle, using the identification signal of the other vehicle; and outputting a control signal for adapting the upper headlight beam boundary, the control signal being output taking the ascertained type of vehicle into account.

An upper headlight beam boundary may be understood to mean a boundary of a light cone or of some other illuminated area which has the greatest vertical distance from an underlying surface on which the vehicle travels. "Another vehicle" may be understood to mean a vehicle which differs from the vehicle which has the headlight whose headlight beam boundary is to be controlled or adapted. An illumination unit may be understood to mean a light-emitting unit such as a taillight, a turn signal, a fog taillight, a headlight, a marker light of a truck, or the like.

A configuration position may be understood to mean a position of the illumination unit on the other vehicle, such as a rear area, or an area of an opening to a trunk or a roof of the vehicle. A vehicle contour may be understood to mean, for example, an outline or a silhouette of the vehicle on the basis of which, for example, certain proportions of the front end area, rear end area, roof area, and/or wheelbase are recognizable and which allow the type of the other vehicle to be deduced. An identification signal of the other vehicle may be understood to mean a signal which contains a piece of information concerning the configuration position of the illumination unit on the other vehicle, and/or a piece of information concerning the vehicle contour. This information may be recorded and encoded by an optical sensor, for example a camera, and transmitted as a bus signal to an appropriate evaluation unit via a data bus. A "type of vehicle" may be understood to mean a class of vehicles, such as passenger vehicles, trucks, motorcycles, or bicycles. In particular, a type of vehicle may also be understood to mean a particular model of a vehicle manufacturer. Alternatively or additionally, a type of vehicle may also be understood to mean a travel direction of the other vehicle, such as "preceding", "oncoming," and or "crossing." A control signal may be understood to mean a signal which is configured to cause a change in a beam direction of light of the headlight in a headlight control unit.

The present invention is based on the finding that now, the light emission characteristic of headlights of the host vehicle are no longer taken into account just using a position or a distance of an illumination source from the host vehicle; rather, the other vehicle itself, having the illumination unit or the certain contour, is analyzed. A configuration position of an illumination unit on the other vehicle may be used, since such a configuration position is usually characteristic for a vehicle class or even an individual model of a vehicle manufacturer. Alternatively or additionally, such a vehicle class or even an individual model of a vehicle manufacturer may be determined by evaluating a vehicle contour, since most vehicle manufacturers want to make their vehicles or vehicle models distinguishable from their competitors specifically via an individual configuration. If the type of the other vehicle is known, a position of the driver or of the head or eyes of the driver may also be deduced, so that the upper headlight beam boundary may be individually set to the recognized other vehicle, it still being ensurable that the driver of the other vehicle is not blinded. The present invention thus offers the advantage that an area to be illuminated by the headlight of the vehicle may be adapted to the recognized other vehicle much more accurately. As a result, what may be a large area ahead of the host vehicle may be illuminated (via which the safety of the host vehicle may be enhanced), and on the other hand what may be a low risk of blinding the driver of the other vehicle may be ensured.

In addition, the present invention provides a control unit which includes units that are configured to carry out or control the steps of a method according to a variant of the method mentioned above.

In the present context, a control unit may be understood to mean an electrical device which processes sensor signals and outputs control signals as a function thereof. The control unit may have an interface which may have a hardware and/or software configuration. In a hardware configuration, the interfaces may be part of a so-called system ASIC, for example, which contains various functions of the control unit. However, it is also possible for the interfaces to be a dedicated, integrated circuit, or to be at least partially composed of discrete components. In a software configuration, the interfaces may be software modules which are present on a microcontroller, for example, in addition to other software modules.

Also advantageous is a computer program product having program code which may be stored on a machine-readable carrier such as a semiconductor memory, a hard drive, or an optical memory, and used for carrying out the method according to one of the above-described specific embodiments when the program is executed on a computer or a device.

According to one specific embodiment of the present invention, in the step of detecting, a position of an illumination unit of the other vehicle may be evaluated with respect to a position of a mirror of the other vehicle in order to provide the identification signal of the other vehicle, in the step of outputting, the control signal for adapting the upper headlight beam boundary being provided in such a way that the headlight of the vehicle does not illuminate the mirror. Such a specific embodiment of the present invention offers the advantage that it may be ensured that the upper headlight beam boundary does not illuminate the mirror, and therefore there is also no indirect blinding of the driver of the other vehicle.

According to one specific embodiment of the present invention, it is advantageous when in the step of detecting, a position of a side mirror and/or of a rearview mirror is evaluated in order to provide the identification signal of the other vehicle. A mirror may be understood to mean, for example, an outside mirror, or a rearview mirror in the ceiling area of the vehicle. In such a specific embodiment of the present invention, there is the advantageous possibility of relatively reliably recognizing the type of the other vehicle by evaluating the position of the mirror with respect to the position of the illumination unit of the other vehicle.

In addition, according to another specific embodiment of the present invention, in the step of detecting, a color of the light emitted by the illumination unit is detected, and a travel direction of the other vehicle is deduced, using the color of the detected light, in order to provide the identification signal of the other vehicle. A color of the light emitted by the illumination unit may be understood to mean, for example, a distinction between white light, which is usually emitted from a headlight of the other vehicle, and a red or yellow light which is emitted from taillights, brake lights, or turn signals, for example. The travel direction of the other vehicle may thus advantageously be ascertained, since, for example, a light from an oncoming vehicle is recognized as white light of the headlights of the other vehicle, whereas light from a preceding vehicle is primarily recognized as red light of the taillights or brake lights. Such a specific embodiment of the present invention offers the advantage that the travel direction may be determined very easily as the type of the other vehicle, so that advance information, for example that the upper headlight beam boundary should be adapted more rapidly (for an oncoming other vehicle, for example) or more slowly (for a preceding other vehicle, for example), may be transmitted to a control unit for controlling the light emission by the headlights.

According to one specific embodiment of the present invention, in the step of detecting, an evaluation of a number of illumination units may also take place in order to provide the identification signal of the other vehicle. Such a specific embodiment of the present invention offers the advantage that certain vehicle classes may be very easily distinguished from one another. For example, the passenger vehicle class has two adjacently situated illumination sources (for example, two adjacently situated headlights or two adjacently situated taillights), whereas only one illumination source is recognizable for motorcycles. In contrast, for the truck vehicle class, additional illumination sources which are formed by the marker lights are recognizable.

According to another specific embodiment of the present invention, in the step of reading in, a piece of information concerning the type of the other vehicle may be wirelessly transmitted from the other vehicle in order to provide the identification signal of the other vehicle. Such a specific embodiment of the present invention offers the advantage that in future vehicles, wireless communication with other vehicles will also be available, which may be used for enhancing traffic safety, also for headlight control. An identification signal may be directly transmitted to the vehicle via such wireless communication, thus allowing verification or plausibility checking of the recognized type of vehicle in the host vehicle. In addition, one specific embodiment of the present invention is conceivable in which when, in the step of reading in, an identification signal of the other vehicle is provided which contains a piece of information that an exact classification of the type of the other vehicle is not possible, in the step of outputting, the control signal is provided in such a way that the upper headlight beam boundary is adapted to a predetermined upper safety limit. Such a specific embodiment of the present invention ensures that a certain safety range in front of or at the other vehicle is not illuminated by the headlight(s) of the host vehicle. In this safety range, which pertains, for example, to an area at which the vehicle is not yet or is no longer present, or which customarily includes only vehicle wheels, the rear end, or a fender of the vehicle, endangerment of the driver of the other vehicle by blinding is not expected. Nevertheless, what may be a large area between the host vehicle and the other vehicle may be illuminated in order to enhance traffic safety and to make obstructions, possibly present in the area between the host vehicle and the other vehicle, recognizable for the driver of the host vehicle at an early stage.

In addition, it is advantageous when, in the step of ascertaining, a position of the head of a driver of the other vehicle is estimated, and in the step of outputting, the upper headlight beam boundary is adapted in such a way that the position of the head of the driver is not illuminated by light of the headlight. In particular for a classification of the other vehicle as a single-tracked vehicle, such as a motorcycle or a bicycle, it is expected that the head of the driver of this vehicle is situated much higher above the roadway than in a passenger vehicle, for example. To ensure that the upper headlight beam boundary also does not strike the eyes of the driver of such other vehicle and thus cause blinding of the driver of this other vehicle, it should be ensured that the position of the head of the driver is not illuminated by light of the headlight of the host vehicle.

According to another specific embodiment of the present invention, in addition to a variant of the present invention mentioned above, the method includes the following steps:
  detecting a time curve of a pitch rate of the vehicle or a value that is dependent on the pitch rate, and/or of a roll rate of the vehicle or a value that is dependent on the roll rate;
  ascertaining an envelope curve and/or an amplitude of the time curve and/or an average value of the time curve;
  providing a control signal for adapting the upper headlight beam boundary, using the envelope curve, in response to a change in the lower envelope curve, and/or providing a control signal for adapting the upper headlight beam boundary using the amplitude, the upper headlight beam boundary being adapted more steeply in the direction of the roadway ahead of the vehicle the greater the amplitude, and/or providing the control signal for adapting the upper headlight beam boundary using the average value of the curve, the upper headlight beam boundary being adapted more steeply in the direction of the roadway ahead of the vehicle the more negative the average value of the curve.

The pitch rate or the roll rate may be ascertained, for example, using an inertial sensor system and/or by evaluating an image of a camera which detects the surroundings of the vehicle. In the envelope curve, the lower envelope curve or the upper envelope curve may be ascertained.

The highest possible upper headlight beam boundary for headlights of a vehicle may be derived from a signal of an inertial sensor system or an image of a surroundings detection device, for example a camera. When another vehicle is detected by the surroundings detection device, a relative angle of the vehicle with respect to the other vehicle may be determined from the image. This relative angle may be used as the highest beam angle for the headlights.

The relative angle has large fluctuations due to the vehicle's own motions. In addition, the relative angle changes due to a motion of the other vehicle relative to the vehicle.

This specific embodiment of the present invention is based on the finding that the motion components of the motion of the host vehicle may be separated via a method according to the approach presented here. In this way, high-frequency, high-amplitude signal components may exert a smaller influence on the headlight beam boundary. This results in potential savings of computing power compared to direct adaptation of the headlight beam to a motion of the host vehicle, and potential savings of computing time, so that trailing in the signal processing may be reduced, which in turn allows a closer approximation of the headlight beam boundary to a glare limit. In addition, the roadway quality may also be ascertained by evaluating the time curve of the pitch rate or a value that is dependent on the pitch rate, such as the pitch acceleration or the pitch angle, or by evaluating the time curve of the roll rate or a value that is dependent on the roll rate, so that the beam angle of the headlights may thus be directly adapted and output even if no other vehicle is visible, or if, once another vehicle has been recognized, no time curve for a position of this vehicle is subsequently present. Instead of the pitch rate or roll rate, the object position in the image of a camera could also be evaluated, since the camera is fixedly installed in the vehicle and thus undergoes the same pitching or rolling motion as the vehicle, which is reflected in the position of the object in the image.

Evaluating the pitch angle or roll angle, or the pitch rate or roll rate, is advantageous since, even before the other vehicle is encountered, a safety angle or safety value, for example, may be appropriately computed, and a headlight control system may reach a steady state more quickly. By evaluating the variation in the pitch angle or roll angle (and the pitch rate or roll rate) of the host vehicle, it is thus also possible, for example, to estimate the roadway quality and the changes in the pitch angle or roll angle which are thus expected.

The headlight leveling control may advantageously respond more quickly, and when the motion components are mutually superimposed, the upper headlight beam boundary does not rise above the glare limit in order to not endanger a driver of the other vehicle.

According to one particular specific embodiment of the present invention, in the step of detecting, the time curve may be detected by evaluating a relative position of at least one feature of another vehicle from an image of a detection range, recorded by a surroundings detection device, in response to a recognition of another vehicle in the detection range of a surroundings detection device of the vehicle. Such a specific embodiment of the present invention offers the advantage of a particularly simple implementation, since in recent vehicles a camera is usually already present, and the evaluation is possible using an evaluation algorithm having a particularly simple configuration.

An upper headlight beam boundary may be understood to mean a transition between a directed, concentrated light beam of a headlight and a scattered light range of the headlight. The headlight beam boundary may represent, for example, a predefined threshold of a light intensity of the headlight. "Another vehicle" may be a vehicle other than the host vehicle. A surroundings detection device may be understood to mean a radar device, a laser scanner, or a camera system, for example. A detection range may be a space that is detectable by the surroundings detection device, or a detectable viewing angle.

The detection range may be aligned with a vehicle longitudinal axis in the travel direction. A feature of the other vehicle may be understood to mean a component of the other vehicle which is recognizable in darkness, for example one or multiple illumination device(s) or one or multiple reflector(s). A relative position may represent a lateral direction and a vertical direction of the feature in the image. Likewise, the relative position may represent only a vertical direction with respect to the feature (z coordinate or z angle). An image of the surroundings detection device may be a pixel image or an information grid from which at least the vertical direction is ascertainable. For example, a sensor of the surroundings detection device may have a predetermined resolution per angular unit. A time curve may be a plot of the relative position over a time period or at certain time intervals. An envelope curve may be understood to mean an envelope over successive (local) maxima (upper envelope curve) and/or minima (lower envelope curve) of a signal. A positive gradient of the envelope curve may be understood to mean that the upper and/or lower envelope curve undergo (es) a change to larger values. The signal values may have a tendency to assume larger signal values. A positive gradient of the envelope curve may also be understood to mean a decreasing distance from the upper and the lower envelope curves. The negative gradient similarly describes a change in the opposite direction. A pitch angle may be understood to mean an angle between a horizontal of the vehicle longitudinal axis and a vertical of the vehicle on the roadway. A pitch value which is dependent on the pitch angle may be understood to mean, for example, a pitch rate, a pitch acceleration, or a similar value which is based on the pitch angle or a change in the pitch angle. An amplitude of the time curve may be understood to mean a difference between different individual values of the time curve.

In the step of providing, the control signal for the upper headlight beam boundary may be provided in such a way that a safety value is taken into account when setting the upper headlight beam boundary, the safety value representing in particular a vertical safety angle by which the upper headlight beam boundary is lowered to a maximum upper headlight beam boundary, the maximum upper headlight beam boundary representing a headlight beam boundary in which no blinding of a driver of the other vehicle occurs. A safety value may be understood to mean a distance or an angle by which the headlight beam boundary may be set lower (i.e., in the direction of the roadway ahead of the vehicle) than the viewing angle of the object or the glare limit in order to not blind the driver of the other vehicle. The safety value may be understood to mean a value by which the headlight beam boundary is lowered to a greater degree than the viewing angle of the object.

In addition, the safety value may be variable, in particular it being possible for the safety value to be smaller when the envelope curve has a positive gradient and/or the amplitude decreases, and alternatively or additionally when an average value of the curve has a positive value. The average value of the curve has a positive value when the vehicle pitches, or tends to pitch, downwardly. The safety value may become larger when the envelope curve has a negative gradient and/or the amplitude increases, and alternatively or additionally, when an average value of the curve has a negative value. The average value of the curve has a negative value when the vehicle pitches, or tends to pitch, upwardly. The safety value may also become smaller when a distance between the vehicle and the other vehicle becomes greater. The safety value may become larger when a distance between the vehicle and the other vehicle becomes smaller. A sufficiently large safety value for future maxima or oscillations may be maintained with a high level of probability due to a response to past maxima and oscillations of the time curve of the relative angle and/or pitch angle and/or pitch value.

It is also advantageous when, according to one specific embodiment of the present invention, the safety value is determined in the step of providing as a function of a recognized vehicle type and/or a recognized travel direction of the other vehicle. Such a specific embodiment of the present invention offers the advantage of particularly good adaptability of the safety value to an instantaneously present scenario of the surroundings of the vehicle, so that the safety of all road users may be achieved by optimal illumination of the roadway ahead of the host vehicle without blinding the other road users. In addition, it is advantageous when, according to one specific embodiment of the present invention, the safety value is determined in the step of providing as a function of an ascertained degree of roadway unevennesses. Such a specific embodiment of the present invention offers the advantage that, based on the data of a camera and additionally or alternatively a pitch sensor system via which pitch angles or pitch values, for example, may be measured, a conclusion may be drawn concerning the roadway quality, even without other recognized vehicles, so that the safety value may be optimally set, thus greatly reducing the risk of blinding of, for example, road users suddenly appearing from behind a curve or a hilltop.

The control signal may be provided in a time-delayed manner when the envelope curve has a positive gradient. The control signal may also be provided in an undelayed manner when the envelope curve has a negative gradient. Alternatively or additionally, the upper headlight beam boundary may be raised in a time-delayed manner when the amplitude decreases. When the amplitude increases, the upper headlight beam boundary may be lowered in an undelayed manner. As the result of a time delay in raising the upper headlight beam boundary, a large portion of the computing power may be saved, since continuous computation is not necessary during the delay. In particular, as the result of a time delay, electromechanical components may also be subjected to less load, since fewer changes in the light distribution which have to be carried out by these components occur in the headlight control system. Due to a direct response to the change in the headlight beam boundary when the upper headlight beam boundary drops, a rapid response may be made to unevennesses on the ground, and blinding of other road users may be avoided.

In the step of detecting, at least one additional time curve of a relative position of at least one feature of the additional other vehicle with respect to the vehicle may be detected in response to a recognition of at least one additional other vehicle in the detection range, and the upper headlight beam boundary may be adapted to that other vehicle which has the lower relative position of the feature of one of the other vehicles in the image. That other vehicle which has the feature with the lower relative position usually has the higher risk of blinding. A risk of blinding may be understood to mean a degree or a likelihood that a driver of the other vehicle is blinded by direct light of the headlight of the (host) vehicle when an unforeseen sudden increase in the relative angle occurs, for example due to driving over a pothole, and directs the light cone of the headlights directly onto the other vehicle.

Operational safety may be increased by comparing multiple other vehicles, since the other vehicle with the highest risk (for blinding) at that moment is used as a reference for the maximum allowable upper headlight beam boundary.

The risk of blinding may also be recognized by taking into account a differential speed difference between the other vehicle and the at least one additional other vehicle. It may thus be taken into account that there is a higher probability that an oncoming other vehicle will enter the blinding range, than, for example, a passing or preceding vehicle.

The present invention is explained in greater detail below as an example, with reference to the appended drawings.

DETAILED DESCRIPTION

Figure 1:
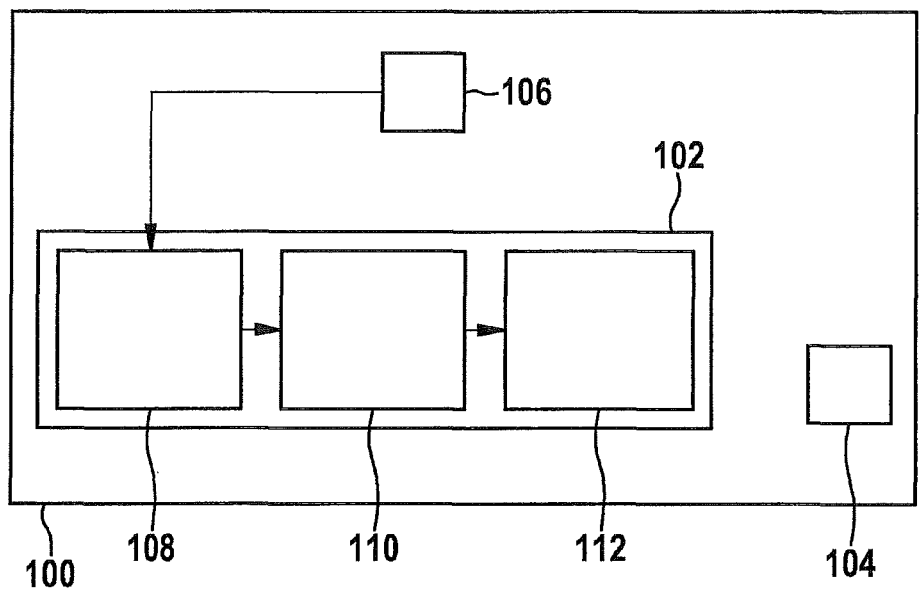
FIG. 1 shows an illustration of a vehicle which includes a control unit according to one exemplary embodiment of the present invention.

In the following description of exemplary embodiments of the present invention, identical or similar reference numerals are used for the elements having a similar action which are illustrated in the various figures, and a repeated description of these elements is dispensed with.

FIG. 1 shows an illustration of a vehicle 100 which includes a control unit 102 for adapting an upper headlight beam boundary of a light cone of at least one headlight 104 of vehicle 100 according to one exemplary embodiment of the present invention. Vehicle 100 includes a surroundings detection device 106 and the at least one headlight 104. Surroundings detection device 106 is configured to provide information or an image concerning a detection range of surroundings detection device 106 for control unit 102. Control unit 102 is configured to provide a control signal for the at least one headlight 104 in response to the information. Control unit 102 includes a detection device 108, a device for ascertaining 110, and a device for providing 112.

Detection device 108 may be configured to detect a pitch angle and/or a pitch rate, and/or its/their variation over time. Detection device 108 is configured to detect, in response to a recognition of another vehicle in the detection range of surroundings detection device 106, a time curve of a relative position of at least one feature of the other vehicle based on an image of the detection range which is recorded by the detection device. Device for ascertaining 110 is configured to ascertain a lower envelope curve of the time curve. A lower envelope curve may be understood to mean a connecting line of successive local minima of the time curve. Alternatively or additionally, device for ascertaining 110 is configured to ascertain an amplitude of the time curve. Device for providing 112 is configured to provide the control signal for adapting the upper headlight beam boundary, using the lower envelope curve, in response to a change in the lower envelope curve.

Alternatively or additionally, device for providing 112 is configured to provide the control signal for adapting the upper headlight beam boundary using the amplitude, whereby the upper headlight beam boundary is provided more steeply in the direction of the roadway ahead of the vehicle the greater the amplitude, and/or the upper headlight beam boundary may be provided more steeply in the direction of the roadway ahead of the vehicle the greater the pitch angle in the opposite direction of the roadway.

Figure 2:
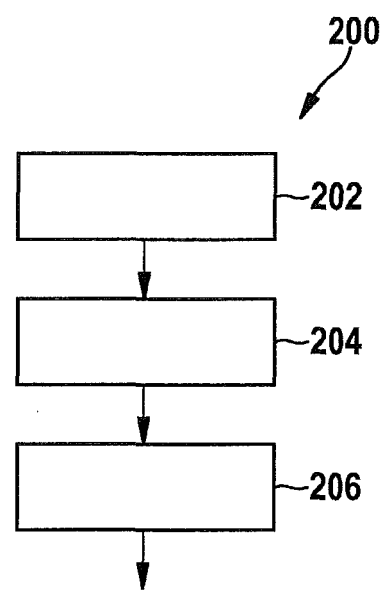
FIG. 2 shows a flow chart of a method according to one exemplary embodiment of the present invention.

FIG. 2 shows a flow chart of a method 200 for adapting an upper headlight beam boundary of a light cone of at least one headlight of a vehicle according to one exemplary embodiment of the present invention. Method 200 may be carried out on a control unit according to FIG. 1. Method 200 includes a step of reading in 202, a step of ascertaining 204, and a step of outputting 206. In the step of reading in 202, at least one configuration position of an illumination unit on another vehicle and/or of a vehicle contour of the other vehicle is read in in order to provide an identification signal of the other vehicle. In the step of ascertaining 204, the type of the other vehicle is ascertained, using the identification signal of the other vehicle. In the step of outputting 206, a control signal for adapting the upper headlight beam boundary is output, the control signal being output taking the ascertained type of vehicle into account.

Figure 3A:
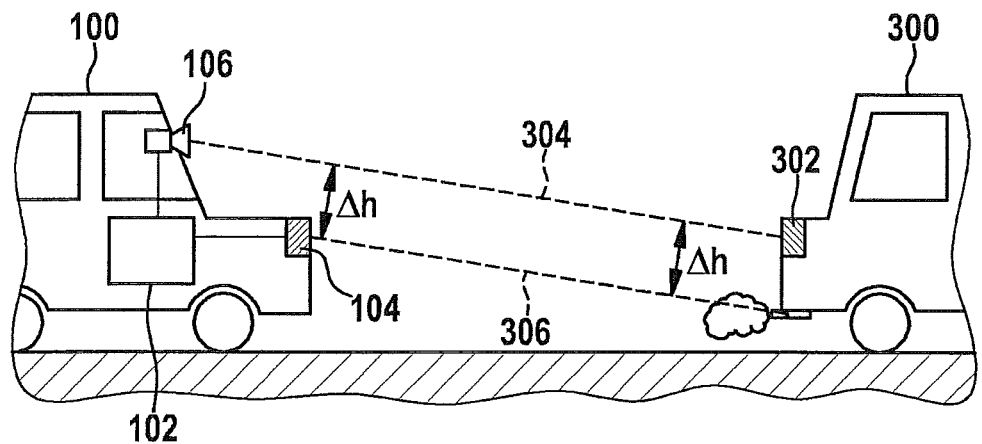
FIGS. 3a and FIG. 3b show illustrations of a vehicle from FIG. 1 together with a preceding other vehicle.
Figure 3B:
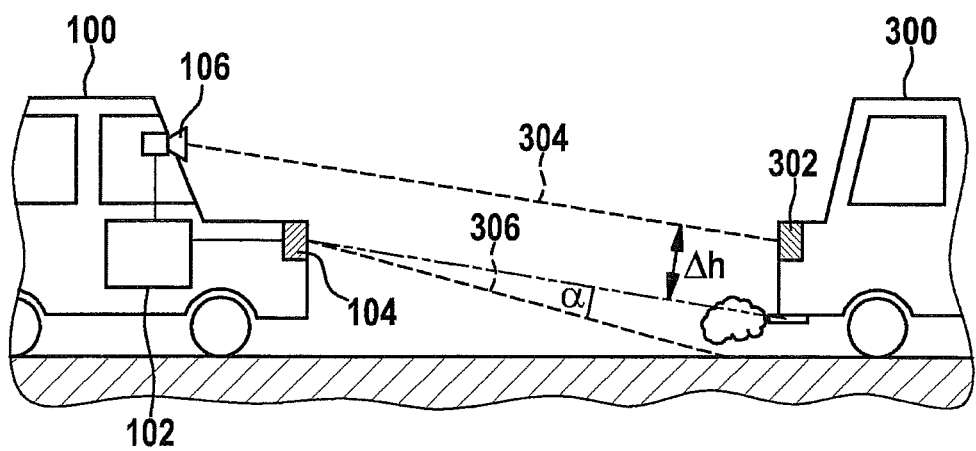

FIGS. 3a and 3b each show an illustration of a vehicle 100 which includes a control unit 102 according to one exemplary embodiment of the present invention, and a preceding other vehicle 300. Vehicle 100 includes at least one controllable headlight 104 which is connected to control unit 102, and a surroundings detection device 106 which likewise is connected to control unit 102. In the present case, surroundings detection device 106 is a camera which is fixedly connected to vehicle 100. Camera 106 is oriented along a vehicle longitudinal axis, and has a detection range which includes the surroundings of vehicle 100 in the travel direction ahead of vehicle 100. Other vehicle 300 is situated within the detection range. Other vehicle 300 has a feature 302 which is recognizable in darkness.

In the present case, feature 302 is at least one taillight of other vehicle 300. Camera 106 detects feature 302. Feature 302 is imaged on at least one pixel on a sensor of camera 106. A coordinate of the at least one pixel on the sensor represents an angle of incidence of a line of sight 304 in camera 106 between camera 106 and the at least one taillight 302. A pixel image of camera 106 is evaluated in control unit 102. A time curve of the coordinate of the at least one pixel is plotted. Since the coordinate of the pixel represents a relative position of other vehicle 300 with respect to vehicle 100, the time curve of the coordinate represents a time curve of the relative position of other vehicle 300. Camera 106 has a distance Δh from the at least one headlight 104.

In FIG. 3a, a headlight beam boundary 306 of a light cone of headlight 104 has an angle of reflection which is identical to the angle of incidence of line of sight 304. Headlight beam boundary 306 at other vehicle 300 likewise has distance from line of sight 304. A driver of other vehicle 300 is not blinded. Distance Δh between camera 106 and headlights 104 is an (implicitly) provided safety distance with regard to height.

When viewing angle α measured by camera 106 is directly taken over as the setting angle of headlights 104, difference Δh in the installation height is maintained. Vehicle dynamics of vehicle 100 may result in blinding which is visible as "flashing," for example. Headlights 104 may be quickly adapted via dynamic headlight leveling control. When the level of computational effort is excessively high, the adaptation may occur "too late," since the operation is not carried out in an anticipatory manner, or the headlights are too slow and have a long response time. Measurement of bumps on the ground is therefore advantageous. In many situations the visual range may be lost via an additional fixed offset for obtaining compensation for the vehicle dynamics. The closer a vehicle 300, the greater the influence of the safety distance due to the installation height. The farther away a vehicle 300, the greater the influence of safety angle α as the safety value.

In FIG. 3b, in addition to the angle of incidence of line of sight 304, headlight beam boundary 306 has a safety angle α as an angle of reflection as the safety value. Due to safety angle α, distance Δh between line of sight 304 and headlight beam boundary 306 increases until the light cone reaches other vehicle 300. Now, with an even greater degree of certainty the driver of other vehicle 300 is not blinded.

Figure 4:
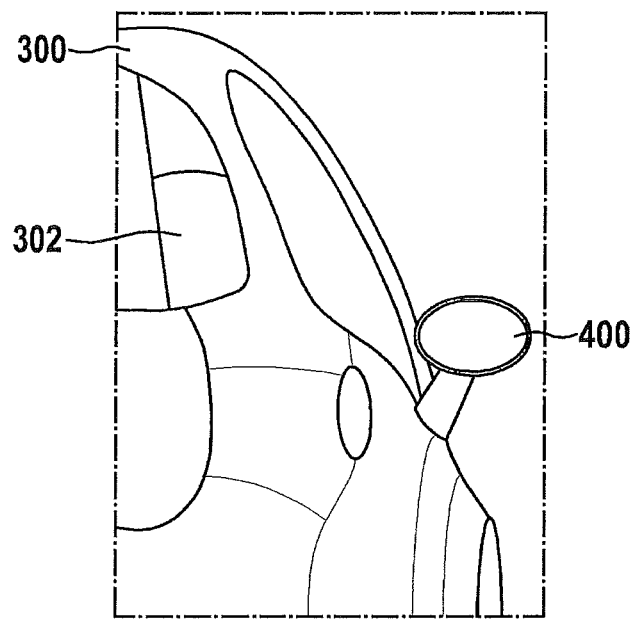
FIG. 4 shows an illustration of a height difference between an outside mirror and a taillight of another vehicle.

FIG. 4 shows an illustration of another vehicle 300 in which a taillight 302, as a feature which is visible in darkness, is situated above outside mirrors 400 of other vehicle 300. When an adaptation of the illumination range of a vehicle traveling behind sets a headlight beam boundary of the headlights to the height of taillights 302, a light cone of the headlights may directly strike outside mirrors 400. Outside mirrors 400 may directly reflect the light cone into a facial area of a driver of other vehicle 300, thus possibly intensely blinding the driver. It is therefore advantageous for the headlight beam boundary to reliably extend below rearview mirror 400.

Figure 5A:
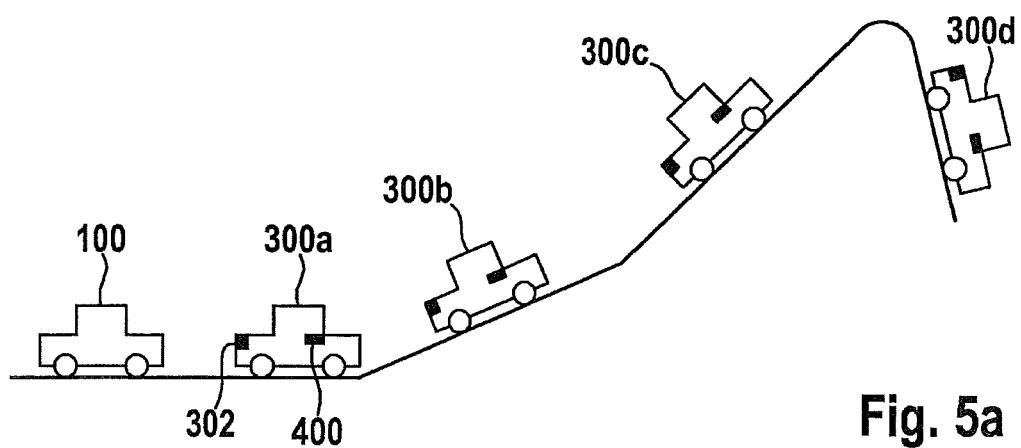
FIG. 5a, FIG. 5b and FIG. 5c show illustrations of a vehicle together with other vehicles in different relative positions.
Figure 5B:
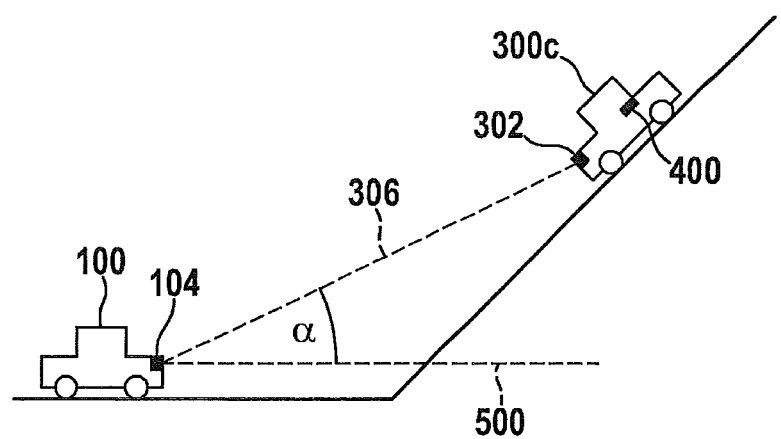
Figure 5C:
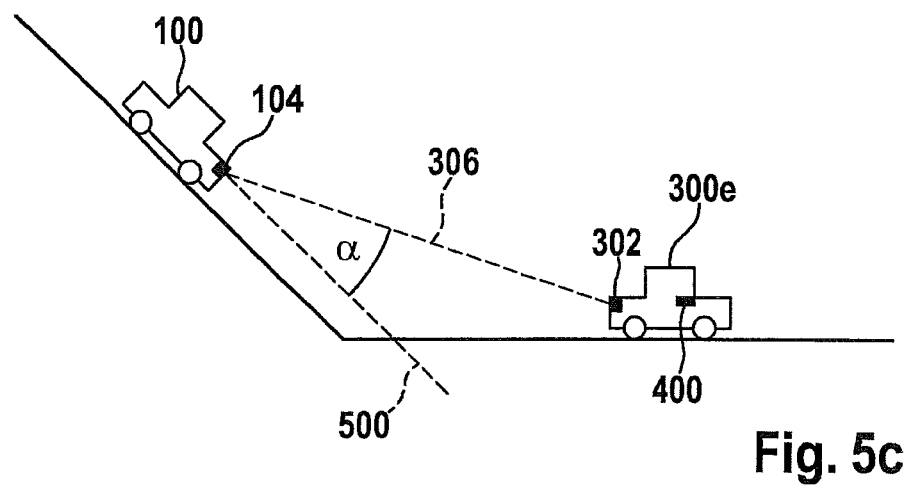

FIGS. 5a, 5b, and 5c show an illustration of a vehicle 100 together with a preceding other vehicle 300. A position of taillights 302 as well as a position of outside mirrors 400 is marked on vehicle 100. The position of side mirrors 400 relative to taillights 302 changes, depending on the vehicle orientation. A fixed safety value such as a safety angle, for example (having an implied safety height) may largely solve the blinding problem.

FIG. 5a illustrates other vehicle 300 in different relative positions with respect to vehicle 100. Vehicle 300a is situated on a flat roadway segment ahead of vehicle 100. Taillights 302 and outside mirrors 400 are situated approximately in a line of sight with respect to vehicle 100. Vehicle 300b is situated on a slightly ascending roadway segment ahead of vehicle 100. Viewed from vehicle 100, taillights 302 are now situated lower than outside mirrors 400. It is therefore now possible to raise a headlight beam boundary of headlights of vehicle 100 without directly illuminating outside mirrors 400 of vehicle 300b. A visual range of a driver of vehicle 100 may thus be improved without blinding a driver of other vehicle 300b. Vehicle 300c is situated on a steeply ascending roadway segment ahead of vehicle 100. Due to the steeply ascending roadway segment, taillights 302, viewed from vehicle 100, are situated considerably below outside mirrors 400. A risk of blinding the driver of other vehicle 300c is therefore even less. Vehicle 300d is situated on a steeply descending roadway segment ahead of vehicle 100.

Taillights 302 are now situated above outside mirrors 400. The headlight beam boundary of the headlights of vehicle 100 is therefore decreased by a safety distance as soon as it is recognized that other vehicle 300d is traveling on a descending roadway segment. The height of outside mirrors 400 above taillights 302 is a function of a roadway inclination or orientation of other vehicle 300. FIG. 5a shows the difference between side mirrors 400 and taillights 302 as a function of the vehicle orientation.

FIG. 5a shows host vehicle 100 traveling on a flat roadway segment, and shows a preceding vehicle 300 (other vehicle) which is traveling up a hill. This configuration results not only when other vehicle 300 is traveling up the hill, but also when host vehicle 100 is traveling down the hill. The position of the vehicles relative to one another plays the primary role. FIGS. 5b and 5c are used for clarification. In FIG. 5b, host vehicle 100 is traveling on a flat roadway segment, and other vehicle 300 is traveling uphill. In FIG. 5c, host vehicle 100 is traveling downhill, and other vehicle 300 is traveling on a flat roadway segment. The scenario is the same for the control system of headlights 104, since everything relates to the camera coordinate system or vehicle coordinate system. Only the relative position of the vehicles and their orientation with respect to one another play a role.

FIG. 5b illustrates vehicle 100 on a flat roadway segment, and other vehicle 300c on a steeply ascending roadway segment. A headlight beam boundary 306 of headlights 104 of vehicle 100 is directed directly onto taillights 302 of other vehicle 300c. No safety distance to outside mirrors 400 is necessary, since other vehicle 300c, viewed from vehicle 100, is situated obliquely, and outside mirrors 400 are situated above headlight beam boundary 306. An exit angle α of headlights 104 is depicted between headlight beam boundary 306 and a vehicle longitudinal axis 500.

FIG. 5c corresponds to FIG. 5b. In this case, however, vehicle 100 is illustrated on a steeply descending surface, while other vehicle 300e is traveling on a flat roadway segment ahead of vehicle 100. Since vehicle longitudinal axis 500 is fixed to vehicle 100, exit angle α is a relative angle, and therefore it is irrelevant whether other vehicle 300c is situated above vehicle 100, or whether vehicle 100 is situated above other vehicle 300e.

Figure 6:
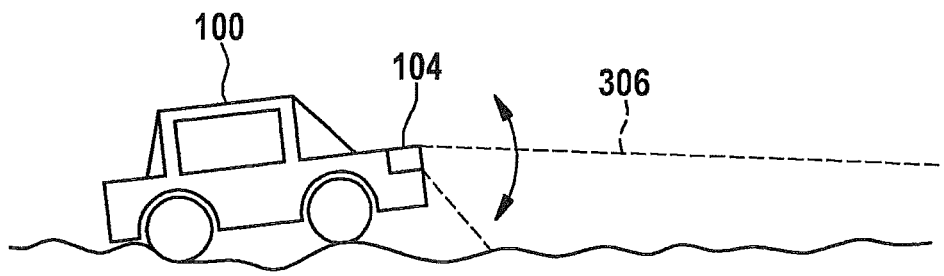
FIG. 6 shows an illustration of a vehicle on uneven ground.

FIG. 6 shows a vehicle 100 with headlights 104 on uneven ground. A headlight beam boundary 306 is fixed to the vehicle as long as no control takes place. Exactly the same as headlight beam boundary 306, a camera (not illustrated here) of vehicle 100 which is fixed to the vehicle undergoes a pitching motion corresponding to the bumps on the ground over which vehicle 100 is traveling. Control may be carried out with the aid of a safety angle as the safety value for AHC, using distance and roadway quality.

Figure 7:
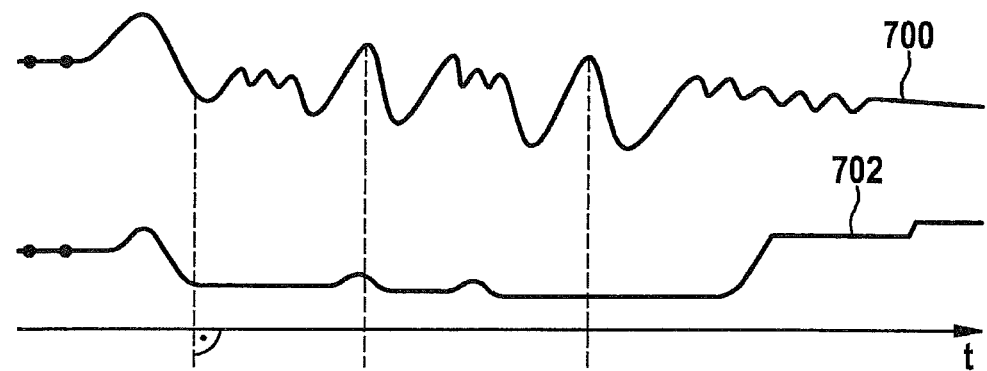
FIG. 7 shows a time recording of an image of taillights of a vehicle, and a time recording of a control unit according to one exemplary embodiment of the present invention.

FIG. 7 shows a time curve of a relative position 700 of a feature of a preceding other vehicle with respect to a vehicle, as detected in the detection device of a control unit according to one exemplary embodiment of the present invention. In addition, FIG. 7 shows a time curve of a control signal 702 at the output of the control unit. Control signal 702 controls a headlight beam boundary of at least one headlight of the vehicle. Taillights 302 move in relative terms. Starting from a neutral position, relative position 700 rises with a moderate slope until reaching a first maximum. Control signal 702 follows relative position 700 in a time-delayed manner. After the first maximum, relative position 700 steeply drops to a first minimum with a large amplitude. The first minimum is illustrated by a vertical dashed line. Control signal 702 follows relative position 700 in an undelayed manner until reaching the first minimum. After the first minimum, relative position 700 oscillates below the neutral position with an average amplitude.

Control signal 702 does not also oscillate, and the lowest value is maintained. After the oscillations, relative position 700 steeply rises until reaching a second maximum, and once again subsequently drops steeply and reaches a second minimum. The second maximum and the second minimum are separated by a large amplitude. The second maximum is once again denoted by a vertical dashed line. Control signal 702 once again follows in a time-delayed manner with slight trailing, but reaches only a low high point, and immediately after the second maximum once again drops to the low level. Subsequent to the second minimum, the relative position once again rises steeply and oscillates above the neutral position with an average amplitude, subsequently drops steeply, and reaches a third minimum. Control signal 702 remains at the low level. Due to the preceding oscillations, a new rise is highly time-delayed. Just before relative position 700 drops to the third minimum, control signal 702 thus rises to a second high point having a very low height. Subsequent to the third minimum, the relative position oscillates about the neutral position with a large amplitude. A maximum of the oscillation is once again denoted by a vertical dashed line.

Since control signal 702 is now highly time-delayed, the control signal remains at the low level. The headlights are not correspondingly adjusted, since overall high dynamics have been identified. After the fourth minimum, the relative position once again oscillates above the neutral position, but has a small amplitude. Control signal 702 once again follows relative position 700 in a time-delayed manner until just below the neutral position, with delayed trailing. Only after relative position 700 has no further oscillations does control signal 702 once again reach the neutral position.

Figure 8:
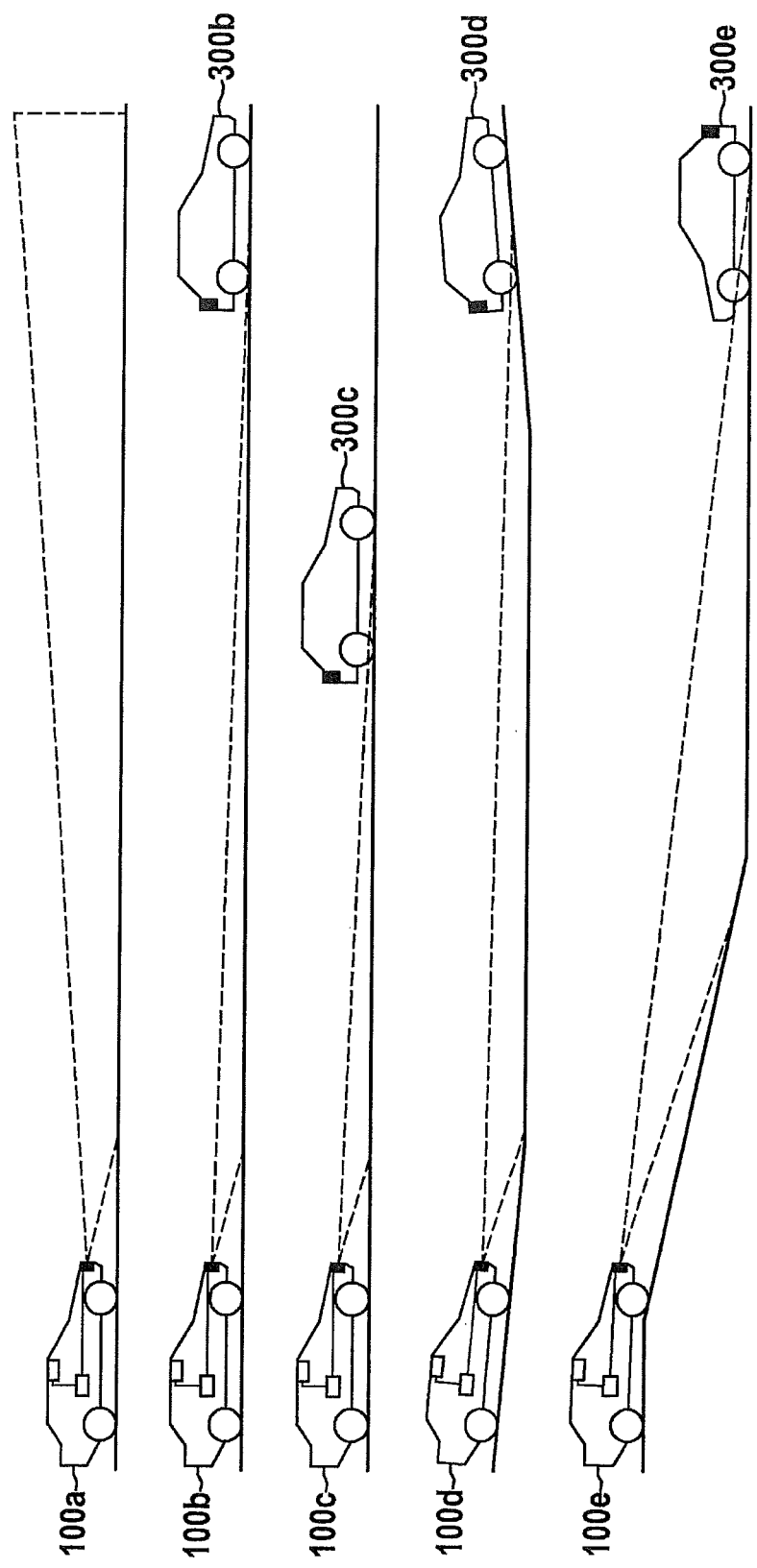
FIG. 8 shows illustrations of various driving situations of a vehicle with light.

FIG. 8 shows a vehicle 100 in various driving situations. In the first driving situation, vehicle 100a is traveling on a flat roadway with the high beam activated. No other vehicle is present ahead of vehicle 100a. In the second driving situation, vehicle 100b is traveling on a flat roadway at a great distance behind another vehicle 300b. Other vehicle 300b is detected by a surroundings detection device of vehicle 100, and according to one exemplary embodiment of the present invention a control unit in vehicle 100 has a headlight beam boundary which is lower by a safety distance than a visual axis with respect to a feature of preceding other vehicle 300b. In the third driving situation, other vehicle 300c is traveling at a smaller distance ahead of vehicle 100c. The upper headlight beam boundary of the light cone of vehicle 100c is lowered further with respect to the roadway than in the second driving situation. In the fourth driving situation, vehicle 100d is traveling on a slight downward slope, and other vehicle 300d is traveling on a slight upward slope. Other vehicle 300d, viewed in relative terms, is thus situated above vehicle 100d, and therefore the control unit raises the upper headlight beam boundary until the headlight beam boundary is once again lower, only by the safety distance, than the line of sight with respect to the feature of other vehicle 300d. In the fifth driving situation, vehicle 100e is situated above other vehicle 300e. Other vehicle 300e is approaching vehicle 100e head-on. The headlight beam boundary is lowered far enough that a driver of other vehicle 300e is not blinded.

The high beam is seldom used at night, since, among other factors, other road users are in the traffic area. For speeds greater than 80 km/h, low beam light has an insufficient illumination range. Adaptive high beam control (AHBC) has been developed for this reason. AHBC dynamically adapts the range of the headlight, so that a maximum range of the headlight is set without blinding other vehicles. The range may be set by setting different beam angles, as illustrated in FIG. 8. The beam angle may be raised in multiple steps, or may be adapted when a vehicle is no longer situated in the traffic area. A high range may thus be attained more quickly while still minimizing potential blinding of newly appearing vehicles.

The parameters vehicle type, vehicle distance, installation height of the camera, and the position in the image, i.e., the inclination of the roadways or the general orientation of the other vehicle, are utilized to have a vertical safety distance with regard to height at the (estimated) height of the driver. The reason is that the side mirrors, via which the driver may be blinded, are situated at the height of the driver. In addition, a braking operation by the other vehicle, which causes pitching of the other vehicle, may be recognized via an activated third brake light, for example. The height difference between the taillights and the mirrors changes during pitching. Rearview mirrors are normally situated above the side mirrors, and therefore are less critical. The rearview mirrors may be dimmed.

When certain areas of the other vehicle are illuminated, this results in blinding of the driver of the other vehicle. These areas include the side mirrors, the rearview mirror, and the area of the driver's head. Since the position of the rearview mirror is normally situated above the side mirrors, and in addition the rearview mirror may be dimmed, in particular the side mirrors and the driver's head may be identified as areas at particular risk for blinding. The side mirrors in particular are relevant in a preceding vehicle, since indirect blinding of the driver may occur via the mirrors. For an oncoming vehicle, in particular the driver's head is relevant for blinding. In addition to the driver's head (directly, and indirectly via mirrors), the aim is also to avoid blinding of passengers.

The camera recognizes other vehicles based on their illumination devices such as headlights, taillights, brake lights, back-up lights, and turn signals. The area particularly at risk for blinding, such as the head of the other road user, normally does not (directly or indirectly) coincide with the illumination device, resulting in differences between the recognized object and the area at risk of blinding. By use of the approach provided here, the control of the headlights is optimized in such a way that the visual range for the driver may be increased by estimating the difference, without impermissibly blinding the other road user.

Oncoming and preceding traffic may be distinguished by the camera, for example via the color of the lights, but also the direction of motion. The vehicle type "truck" may be identified via the marker lights. Two-wheelers, for example, may be identified via the number of illumination devices. Additionally or alternatively, the vehicle type may be classified, for example, via model recognition of the overall vehicle. Via a communication device it is likewise possible to transmit information between the vehicles directly ("car-to-car") or indirectly ("car-to-infrastructure"), from which the required safety height may be ascertained as the safety value. Thus, in addition to the vehicle type, geometric data of the vehicle such as the height and/or installation positions of vehicle parts (mirrors, driver's seat, for example) may be transmitted, and additionally or alternatively the vehicle make and/or model, from which the required safety height may be ascertained. If an unambiguous classification of the vehicle type cannot be made, the safety value may be selected as a function of the likelihood of belonging to the individual classes.

Alternatively, a standard value for the safety height may be assumed as the safety value in order to not blind the other road user. This is the case in particular when the other vehicle is far away, which makes a classification more difficult. Preceding two-wheelers may be differentiated into two-wheelers having side mirrors or rearview mirrors, and two-wheelers without rearwardly facing mirrors. Bicycles in particular normally do not have rearwardly facing mirrors. Due to their low speed and usually limited visibility, cyclists are at particular risk in roadway traffic. By increasing the beam angle or a negative safety distance, a particularly large portion of the cyclist may be illuminated without blinding the cyclist. In this way the driver may identify the cyclist particularly well and correctly, for example based on the movement of the legs. The rider's head, which is the area at risk for blinding, likewise should not be illuminated in the case of preceding two-wheelers due to the risk of blinding when the rider looks back. For two-wheelers having rearwardly facing mirrors, these in addition to the rider's head are areas at risk for blinding.

Headlights are always situated below the driver's eyes. This results in a difference between a recognized road user and the driver's head, which is the area at risk for blinding. Therefore, in principle, a negative safety distance (height) may be selected for the headlights. By selecting a negative safety distance (height), the visual range for the driver of the vehicle may be increased without causing blinding of the other driver.

When the vehicle type is estimated (based on marker lights of trucks, for example), the safety height may be computed even more accurately (in the normal case, truck drivers sit considerably above the taillights and headlights).

Trucks frequently have marker lights in order to be recognized early, even at hilltops. A vehicle may be classified as a truck based on the illuminating marker lights, which may be recognized by the camera. The safety height is correspondingly decreased, or the light-dark cutoff is raised, as the result of which the visual range for the driver is even further increased, but the driver of the classified vehicle type is not blinded. For a crossing vehicle which is illuminated from the side, the light-dark cutoff should be raised only enough so that neither indirect blinding by the mirrors nor direct blinding of the driver and of passengers occurs.

In the present invention, a vehicle type may be understood to mean the travel direction (for example, preceding, oncoming, crossing) as well as the vehicle class (for example, passenger vehicle, truck, two-wheeler), the model type (for example, compact car, sport utility vehicle), or model series (for example, vehicles of a model type of a manufacturer which frequently have similar geometric properties), and/or specific vehicle models.

In addition to the safety height as the safety value, which may be ascertained from the object parameters, additionally or alternatively a safety height may be ascertained as a function of the installation position of the camera, the headlights, and the object position. Due to the usually offset installation of the camera and the headlights, this may result in a loss of visual range for the driver, or blinding of the other road user, as a function of the object position. When the object is situated below the camera, for example below the camera-headlight line, blinding may occur due to the different installation position. However, if the object is situated above, this may result in a loss of visual range for the driver. The installation positions of the camera and the headlights are known during manufacture. There are also approaches in which the camera calibrates itself after a certain distance and may estimate the installation position. Thus, the headlight control system may advantageously be adapted to the geometric conditions.

The safety height as the safety value for avoiding blinding of the other road user is ascertained relative to the position of the recognized object. A safety value such as a safety angle is ascertained from the safety height as a function of the object distance. The beam angle of the at least one headlight may be ascertained with the aid of the safety angle and the direction of the recognized object and/or the position in the image. In addition to the height difference, the lateral difference between the light fixtures (taillight, headlight) and the area at risk for blinding (the driver's eyes, directly or indirectly via reflective surfaces) likewise has an influence. In this case, as a result of the geometric conditions, in particular the relative position of the other vehicle with respect to the headlights to be controlled plays a role.

The geometric properties of the other vehicle change, depending on its relative position. For example, when traveling uphill, the taillights of a preceding vehicle are lower, compared to the side mirrors which are at risk for blinding, than when traveling on a flat roadway or traveling downhill. The safety value, in particular the safety height or the safety angle, may thus advantageously be adapted to the topography and the relative position of the other vehicle, so that an increased visual range is possible without blinding the other driver.

As an alternative to the "safety height" (safety distance with regard to height), a distance of the light-dark cutoff from the other vehicle may be computed. The safety distance may be selected in a different way, depending on the type of light fixture (headlights/taillights). The farther away a vehicle is, the less light reaches it. "Blinding" of a vehicle far away may hardly be a factor (for example, a vehicle approaching head-on many hundreds of meters away travels with the high beam activated, and therefore blinding is barely perceivable). The farther away a vehicle is, the more risk-tolerant the control may be (i.e., higher beam angle of the headlight, smaller safety value for the control).

The orientation of the safety angle has been driven, among other things, by the compensation for roadway unevennesses. Originally, a fixed safety angle was used as the safety value as a compromise between the visual range for the driver and avoiding blinding of other road users. If the roadway quality may now be measured, the safety angle may be optimized thereto. The roadway quality may be independently measured by the vehicle. For example, the pitch angle of the vehicle may be evaluated. If the pedal positions and/or acceleration/braking operations of the vehicle are also taken into account, the pitching motion of the vehicle caused by the roadway unevenness may be estimated. In addition, use may be made of patterns and nonuniform pavement color on the roadway in order to view portions which have been patched and which usually do not have a smooth transition, which may result in pitching.

If bumps on the ground are directly recognized, these may likewise be included in the safety value, for example the safety angle. Even if the bumps on the ground have been deliberately installed (for slowing down traffic in low-speed areas), the roadway quality for the driver and the overall system decreases, since driving under uniform conditions is not possible.

The roadway quality may likewise be deduced by detecting "flashing" from headlights of other vehicles. A safety distance with regard to height is already implicitly incorporated due to the distance between the camera and the headlights. This distance may be included in the computation of the dynamic safety value, for example the safety angle. The distance may vary, depending on the vehicle and the installation position: if the camera is mounted in the driver's cab and the truck brakes, the driver's cab pitches more intensely than the headlight. The distance between the camera and the headlight changes due to the pitching, as the result of which the implicitly provided safety distance with regard to the height or the safety angle, i.e., the safety value, is changed.

The roll angle is important for CHC (glare-free high beam): when the lateral shadow borders are provided just short of the "de-illuminated" vehicle, and the host vehicle rolls, this may result in blinding. The roll angle may be detected in the detection device. The roll angle for the safety distance computation may also be used for AHC (sliding headlight leveling control), since as a result, the normally horizontal light-dark cutoff extends at an angle. In addition, when the light distributions do not extend precisely straight ahead, the headlight light distribution may be utilized to more accurately compute the safety distance at the particular point.

The motion/dynamics of the other vehicle likewise has/have an influence on the safety angle. When the vehicle is approaching head-on, a greater safety distance may be selected, depending on the speed; a different distance/angle may be selected, depending on the travel direction (via the color of the lights, for example), the image position, and the image movement.

For large distances the speed may be estimated with difficulty; therefore, the speed of the host vehicle may be used as an approximation. The dynamics of the other vehicle may also be detected via the movement in the image. If the vehicle does not move in a single (vertical) direction, the safety value, for example the safety angle, may be adapted to the rate of change. If it is possible to estimate the magnitude of the fluctuations, the safety distance may be adapted thereto.

Figure 9A:
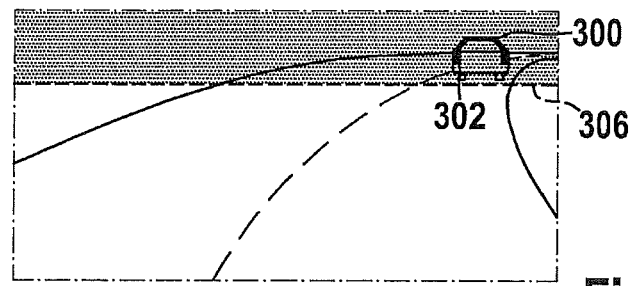
FIG. 9a and FIG. 9b show illustrations of a controlled headlight beam boundary according to one exemplary embodiment of the present invention.

Instead of a camera, in general an anticipatory sensor may be used. A combination of sensors is also conceivable. For example, the distance between the vehicles could be measured by a radar system. The roadway quality, and additionally or alternatively the safety value that is actually required, could be taken from a navigation map in which these parameters have been previously stored (either by the manufacturer or as a "learning map" by the vehicle system itself). Likewise, a sensor having spatial resolution, such as a stereo camera system, may be used. FIG. 9a shows a camera image of a surroundings detection device of a vehicle. The camera image shows another vehicle 300, having taillights 302, on a roadway with a slight right hand turn. Using a method for adapting an upper headlight beam boundary 306 of a light cone of at least one headlight of the vehicle according to one exemplary embodiment of the present invention, a relative position of taillights 302 is recorded, and headlight beam boundary 306 is lowered far enough so that a driver of other vehicle 300 is not blinded.

Figure 9B:
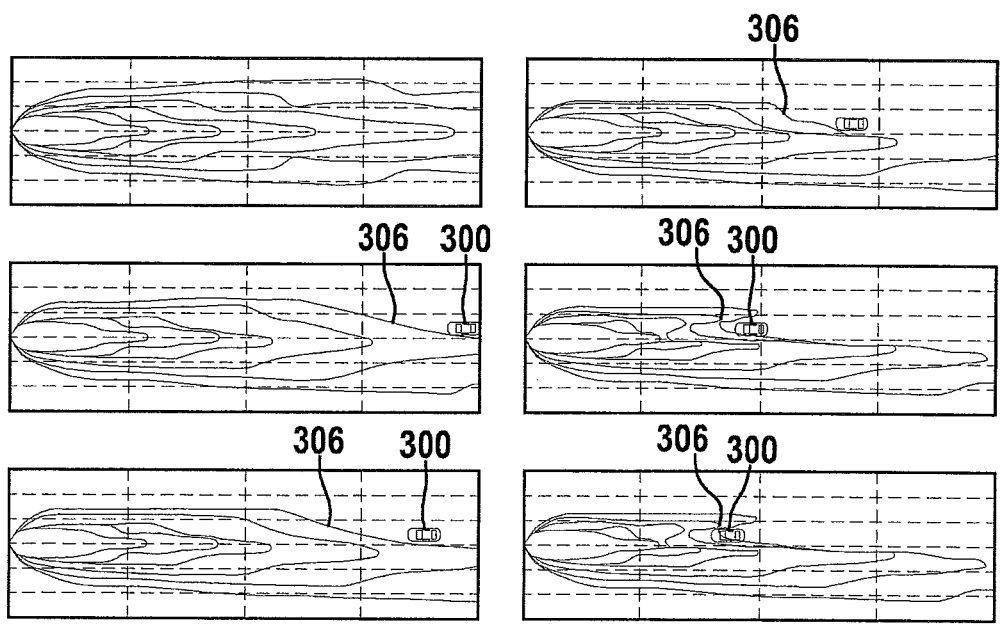

FIG. 9b shows multiple top views of multiple images of light cones on a roadway for different distances of another vehicle 300 from the vehicle. No other vehicle 300 is depicted in the first top view, and the light cone is symmetrical. Other vehicle 300 is depicted at a large distance from the vehicle in the second top view. The light cone is slightly deformed ahead of other vehicle 300, and a headlight beam boundary 306 is situated ahead of other vehicle 300. In the third top view, other vehicle 300 is illustrated closer than in the second top view, and headlight beam boundary 306 is lowered further. In the fourth and fifth top views, other vehicle 300 continues to approach, and headlight beam boundary 306 is lowered further until a minimum distance for headlight beam boundary 306 is reached in the fifth illustration. In the sixth illustration, other vehicle 300 is illustrated even closer to the vehicle, but the light cone is not yet further deformed. A possibility of blinding a driver of other vehicle 300 is now accepted in order to keep a visual range of a driver of the vehicle to a minimum, as is the case for low beam light, for example.

Instead of controlling the headlight only in the illumination range (for example, AHC and adaptive low beam control (ALBC) (dynamic headlight leveling control), even more light may be brought into the traffic area via a glare-free high beam without additional blinding. Thus, the high beam should always be activated while driving, and areas in which other road users are present should be "de-illuminated." An implementation option of the glare-free high beam as continuous headlight control (CHC) is illustrated in FIG. 10. CHC is sometimes also referred to as a "vertical cut-off-line" (vCOL).

Figure 10A:
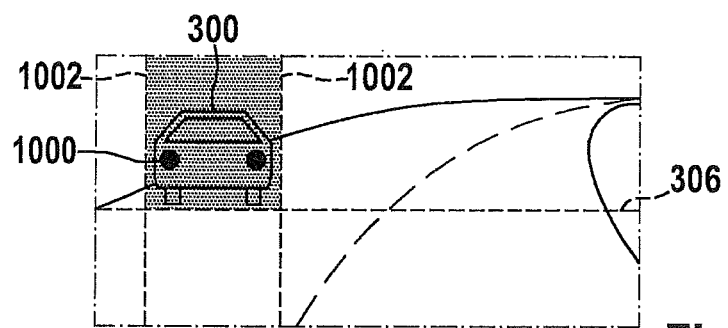
FIG. 10a and FIG. 10b show illustrations of a controlled vertical and horizontal headlight beam boundary according to one exemplary embodiment of the present invention.

FIG. 10a, the same as FIG. 9a, shows a camera image of a surroundings detection device of a vehicle. In contrast to FIG. 9a, other vehicle 300 is approaching the vehicle head-on. Headlights 1000 are imaged as features which are recognizable in darkness. In addition, vertical headlight beam boundaries 1002 to the left and right of other vehicle 300 are illustrated. In this way, the roadway to the left and right of other vehicle 300 may be better illuminated.

Figure 10B:
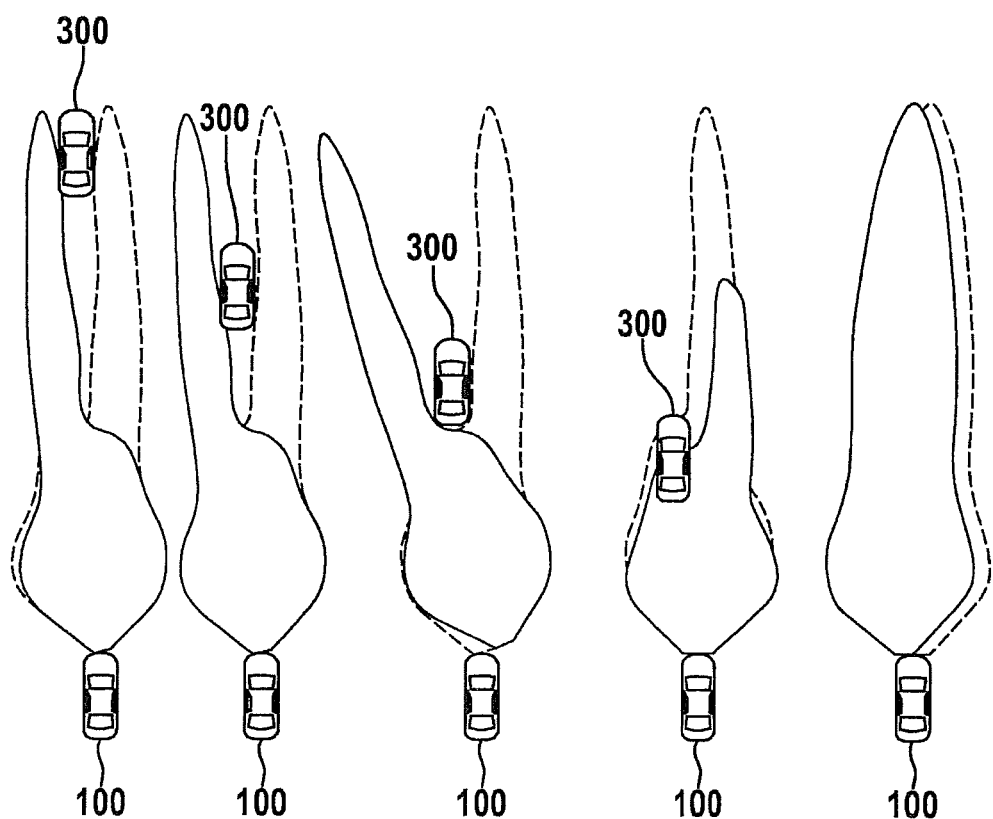

FIG. 10b shows a top view of multiple driving situations of vehicle 100 in which the horizontal and the vertical headlight beam boundaries are adapted to another vehicle 300. For this purpose, the headlights may be swiveled horizontally and vertically independently of one another. Each of the headlights emits a light cone which is directed past the left or right of other vehicle 300 until a minimum distance of the horizontal headlight beam boundary is reached. The horizontal headlight beam boundary then remains in order to ensure a minimum illumination of the roadway, and other vehicle 300 enters into the light cone of the headlights, and the light cone then corresponds to that of a normal low beam light.

When AHC and CHC are comparatively illustrated from the driver/camera perspective, for the boundary which delimits the blinding range from below, this results in the same or at least a very similar approach for an optimized setting of the vertical emission characteristic of headlights. Accordingly, the boundary which delimits the blinding range from below may likewise be understood to mean the upper headlight beam boundary. The vehicle detection in darkness (VDD) detection algorithm presented here recognizes other vehicles at night based on the illumination (headlights/taillights). The distance is estimated via the distance from the left and right headlights in the image, since the distance is similar for all vehicles.

Technically, it is possible to control the headlights in an infinitely variable manner, so to speak. Due to the infinitely variable control of the headlights, the illumination may be brought closer to the other vehicle. Likewise, operations may be carried out using a fixed angular offset. The offset may be selected in such a way that blinding of other road users may be avoided during pitching motions. The offset should also take into account different installation heights of the rearview/side mirrors of various vehicles. The mirrors are sometimes situated below the taillights. Thus, depending on the distance from the other road users, good illumination is thus achieved, but a loss of visual range may still be reduced. When multiple road users are included, various computations may be carried out which have corresponding advantages and disadvantages with regard to computing accuracy and computing speed.

The object which is situated lowest is the most at risk from pitching motions. Due to geometry, this is also usually the object situated closest to the host vehicle (as a function of the installation height of the headlights). The rapid computation of the exact safety value (the safety angle, for example) due to rapid preselection of a vehicle is advantageous.

A degree of criticality concerning the likelihood and the effects of the blinding of the other vehicle may be computed for each vehicle in the image. For this purpose, in addition to the distance and the object position in the image, the travel direction (movement in the image, color of the lights) and the vehicle type may also be important. Oncoming vehicles are at higher risk than preceding vehicles, since oncoming vehicles move more quickly ahead of the vehicle due to the greater differential speed. A change in the (visual) angle therefore takes place more quickly. Two-wheelers have higher dynamics, and at the same time, lower stability, than other vehicles. Two-wheelers enter more quickly into the blinding range due to the dynamics, whereby, due to the lower stability, blinding may have a more adverse effect than for other vehicles. Selecting an individual vehicle is advantageous, since optimized control for the vehicle, also with regard to driver comfort, may thus be carried out. However, the selection of the individual vehicle requires a higher level of computational complexity than the selection of the lowermost object.

When the safety value (the safety angle, for example) is computed for each individual object, a "global" optimization of the safety angle is possible. With this type of computation, the light cone may be brought most closely to the other vehicles, since the optimal safety angle for all vehicles is known. The computational complexity is correspondingly high due to the computation of the safety angle for each individual vehicle.

It is also possible to blend the computation methods. Thus, for example, the vehicles at highest risk for blinding may be ascertained, and within this group a different computation method (consideration of each vehicle individually) may be selected for computing the safety distance. For example, one-half of the group of vehicles may be considered when only one-half of the vehicles are farthest to the bottom in the image, since the risk of blinding due to pitching motions is highest for these vehicles. A more accurate treatment may be carried out for this group (for example, consideration of the safety angle for all vehicles).

The exemplary embodiments which are described and shown in the figures are selected only as examples. Different exemplary embodiments may be combined with one another in their entirety, or with respect to individual features. In addition, one exemplary embodiment may be supplemented with features of another exemplary embodiment.

Furthermore, method steps according to the present invention may be repeated and carried out in a sequence other than that described.

An exemplary embodiment which includes an "and/or" linkage between a first feature and a second feature may be construed in such a way that according to one specific embodiment, the exemplary embodiment includes the first feature as well as the second feature, and according to another specific embodiment includes only the first feature or only the second feature.

What is claimed is:

1. A method for adapting an upper headlight beam boundary of a light cone of at least one headlight of a vehicle, the method comprising the steps of:
   reading in at least one configuration position of an illumination unit on at least one of another vehicle and a vehicle contour of the other vehicle to provide an identification signal of the other vehicle;
   using the identification signal of the other vehicle, ascertaining a type of the other vehicle, the type being at least one of a class and a model of the other vehicle; and
   based on the ascertained type of the other vehicle, outputting a control signal to adapt the upper headlight beam boundary.

2. The method of claim 1, wherein in the reading in step, a position of an illumination unit of the other vehicle is evaluated with respect to a position of a mirror of the other vehicle to provide the identification signal of the other vehicle, and wherein in the outputting step, the control signal for adapting the upper headlight beam boundary is provided so that the headlight of the vehicle does not illuminate the mirror.

3. The method of claim 2, wherein in the reading in step, a configuration position of at least one of a side mirror and a rearview mirror of the other vehicle is evaluated to provide the identification signal of the other vehicle.

4. The method of claim 1, wherein in the reading in step, a color of the light emitted by the illumination unit is read in, and in the ascertaining step, a travel direction of the other vehicle is deduced using the color of the read-in light.

5. The method of claim 1, wherein in the reading in step, an evaluation of a number of illumination units of the other vehicle occurs to provide the identification signal of the other vehicle.

6. The method of claim 1, wherein in the reading in step, a piece of information concerning the type of vehicle is wirelessly transmitted from the other vehicle to provide the identification signal of the other vehicle.

7. The method of claim 1, wherein when, in the reading in step, an identification signal of the other vehicle is provided which contains a piece of information that an exact classification of the type of the other vehicle is not possible, and wherein in the outputting step, the control signal is provided so that the upper headlight beam boundary is adapted to a predetermined upper safety limit.

8. The method of claim 1, wherein when, in the ascertaining step, a position of the head of a driver of the other vehicle is ascertained, and wherein in the outputting step, the upper headlight beam boundary is adapted so that the position of the head of the driver is not illuminated by light of the headlight.

9. The method of claim 1, wherein the control signal causes a beam angle of the at least one headlight to be altered, thereby altering the upper headlight beam boundary.

10. A control unit, comprising:
    at least one control arrangement for adapting an upper headlight beam boundary of a light cone of at least one headlight of a vehicle, including:
       a reading arrangement to read in at least one configuration position of an illumination unit on at least one of another vehicle and a vehicle contour of the other vehicle to provide an identification signal of the other vehicle;
       an ascertaining arrangement to ascertain, using the identification signal of the other the other vehicle, a type of the other vehicle, the type being at least one of a class and a model of the other vehicle; and
       an outputting arrangement to output a control signal, based on the ascertained type of vehicle, to adapt the upper headlight beam boundary.

11. A non-transitory computer readable medium having a computer program, which is executable by a processor, the computer program comprising program code for adapting an upper headlight beam boundary of a light cone of at least one headlight of a vehicle by performing the following:
    reading in at least one configuration position of an illumination unit on at least one of another vehicle and a vehicle contour of the other vehicle to provide an identification signal of the other vehicle;
    using the identification signal of the other vehicle, ascertaining a type of the other vehicle, the type being at least one of a class and a model of the other vehicle; and
    based on the ascertained type of the other vehicle, outputting a control signal to adapt the upper headlight beam boundary.

12. A method for adapting an upper headlight beam boundary of a light cone of at least one headlight of a vehicle, the method comprising the steps of:
    reading in at least one configuration position of an illumination unit on at least one of another vehicle and a vehicle contour of the other vehicle and evaluating a position of the illumination unit of the other vehicle with respect to a position of a mirror of the other vehicle to provide an identification signal of the other vehicle;
    using the identification signal of the other vehicle, ascertaining a type of the other vehicle, the type being at least one of a class and a model of the other vehicle; and
    based on the ascertained type of the other vehicle, outputting a control signal to adapt the upper headlight beam boundary, including providing the control signal for adapting the upper headlight beam boundary so that the headlight of the vehicle does not illuminate the mirror.

* * * * *